United States Patent
Lei et al.

(10) Patent No.: US 11,353,595 B2
(45) Date of Patent: Jun. 7, 2022

(54) SIDELOBE SUBTRACTION METHOD IN AUTOMOTIVE RADAR SIGNAL PROCESSING

(71) Applicant: Baidu USA LLC, Sunnyvale, CA (US)

(72) Inventors: Lei Lei, Sunnyvale, CA (US); Mei-Li Chi, Sunnyvale, CA (US); Davy Huang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 344 days.

(21) Appl. No.: 16/533,303

(22) Filed: Aug. 6, 2019

(65) Prior Publication Data

US 2021/0041574 A1    Feb. 11, 2021

(51) Int. Cl.
| | |
|---|---|
| *G01S 7/292* | (2006.01) |
| *G01S 13/53* | (2006.01) |
| *G01S 7/52* | (2006.01) |
| *G01S 19/29* | (2010.01) |
| *G01S 13/28* | (2006.01) |
| *H01Q 3/01* | (2006.01) |

(52) U.S. Cl.
CPC ............. *G01S 19/29* (2013.01); *G01S 7/292* (2013.01); *G01S 7/52047* (2013.01); *G01S 13/28* (2013.01); *G01S 13/53* (2013.01); *H01Q 3/01* (2013.01)

(58) Field of Classification Search
CPC .......... G01S 19/29; G01S 7/292; G01S 13/28; G01S 13/53; H01Q 3/01
See application file for complete search history.

(56) References Cited

U.S. PATENT DOCUMENTS

| | | | | |
|---|---|---|---|---|
| 5,874,917 | A * | 2/1999 | Desodt .................. | G01S 7/2813 342/379 |
| 2004/0227659 | A1 * | 11/2004 | Woodford ............. | G01S 13/904 342/25 R |
| 2018/0329034 | A1 * | 11/2018 | Bilik ....................... | G01S 7/414 |
| 2020/0142049 | A1 * | 5/2020 | Solodky ................ | G01S 13/931 |
| 2020/0150221 | A1 * | 5/2020 | Prados .................. | G01S 13/426 |

* cited by examiner

*Primary Examiner* — Donald H B Braswell
(74) *Attorney, Agent, or Firm* — Womble Bond Dickinson (US) LLP

(57) ABSTRACT

A method is disclosed for suppressing sidelobes due to artifacts introduced by FFT operations during automotive radar signal processing. Sidelobes of a stronger target from the FFT operations may bury the response from a weaker target when there are multiple targets. The method estimates the sidelobes of an identified target from a measured FFT response and subtracts the estimated sidelobes from the measured FFT response. The identified target may be the strongest target from the measured FFT response. The method estimates the sidelobes to suppress the sidelobes with respect to the peak signal of the identified target. After the estimated sidelobes of the identified target are removed, the updated FFT response may reveal other targets that had been buried. The method may identify additional targets to estimate their sidelobes and may iteratively remove the estimated sidelobes of additional targets from the FFT until a desired sidelobe residual level is achieved.

18 Claims, 8 Drawing Sheets

SIDELOBE SUBTRACTION METHOD IN AUTOMOTIVE RADAR SIGNAL PROCESSING

TECHNICAL FIELD

Embodiments of the present disclosure relate generally to operating autonomous vehicles. More particularly, embodiments of the disclosure relate to processing of radar signals for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of the motion planning and control operations depends heavily on the sensors of the vehicle and information extracted from the sensors. Sensors such as cameras, light detection and range (LIDAR) units, radars, etc., are used to capture video and electromagnetic images of environments around the vehicle for motion planning and control. For example, automotive radars transmit electromagnetic waves such as frequency modulated continuous wave (FMCW) signals and receive the backscattering energy from targets on the road. The received radar signals containing the energy from the reflected electromagnetic field, called the radar raw data, may be processed using fast Fourier Transform (FFT) to extract the range, Doppler velocity and angle information of the targets. However, FFT processing generates artifacts such as a series of sidelobes. The power of the first sidelobe for a linear array may be as high as −13.26 dB of the power of the mainlobe. The sparse array has even higher sidelobe level than that of linear array. The result is that if there are multiple targets present, a weak target that would otherwise be detected at a sidelobe location of a stronger target in the FFT result may be buried by the high FFT sidelobes of the stronger target. Even when there is only a single target present, the high sidelobes of the target may prevent a clean image of the target from being generated by an image radar.

Some automotive radars choose to tolerate the FFT sidelobes to keep the signal processing simple, but suffers a performance degradation in target detection or signal resolution. Other automotive radars may attempt to suppress the sidelobes by processing the FFT using a taper window. However, using the taper window to suppress sidelobes may broaden the width of the mainlobe and may undesirably decrease the resolution of the FFT bins. Sidelobe suppression using the taper window may also be limited to FFT that operates on a relatively small number of points, limiting its application to radar having a relatively small number of array channels, for example, 12 virtual array channels in a 3Tx by 4Rx MIMO array. It is desirable to find a FFT-sidelobe suppression method that overcomes the deficiencies of the existing methods.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
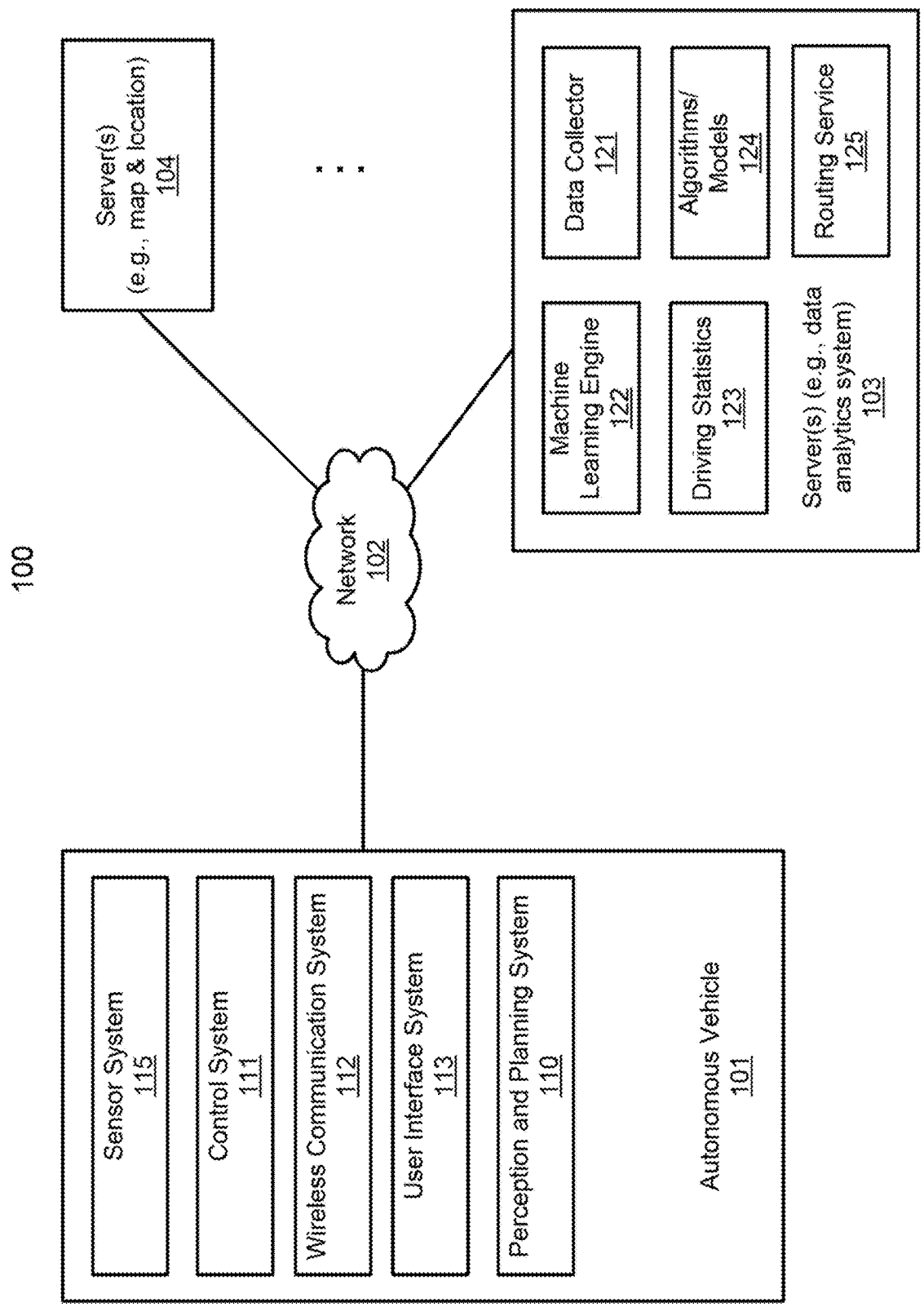
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is disclosed for suppressing sidelobes due to artifacts introduced by FFT operations during automotive radar signal processing. FFT may be used to extract the range, Doppler velocity and angle information of targets in autonomous vehicle applications. Sidelobes of a stronger target introduced by the FFT operations may bury the response from a weaker target when there are multiple targets. The method estimates the sidelobes of an identified target from a measured FFT response and subtracts the estimated sidelobes from the measured FFT response. The identified target may be the strongest target from the measured FFT response. The method may estimate the sidelobes using various levels of computational effort to suppress the sidelobes to different levels with respect to the peak signal or the mainlobe of the identified target. Suppression of sidelobes by 9 dB or more compared to the sidelobe before the suppression may be achieved as a function of the computational effort expended and the performance improvement desired. After the estimated sidelobes of the identified target are removed, the updated FFT response may reveal other targets that had been buried or obscured. The method may identify additional targets to estimate their sidelobes and may iteratively remove the estimated sidelobes of additional targets from the FFT until a desired sidelobe residual level is achieved.

In one embodiment, a computer-implemented method for suppressing FFT sidelobes in the FFT response of one or more targets to radar signals is included. The method includes performing a FFT operation on the received radar signals to obtain original FFT data. The method also includes identifying a target signal of a target from the original FFT data. The method further includes estimating the FFT sidelobes of the target based on the target signal. The method further includes subtracting the estimated FFT sidelobes of the target from the original FFT data to update the FFT data, wherein the updated FFT data has a residual FFT sidelobe level. The method further includes determining if the residual FFT sidelobe level is lower than a desired threshold. If it is, the method extracts information of the target from the updated FFT data.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
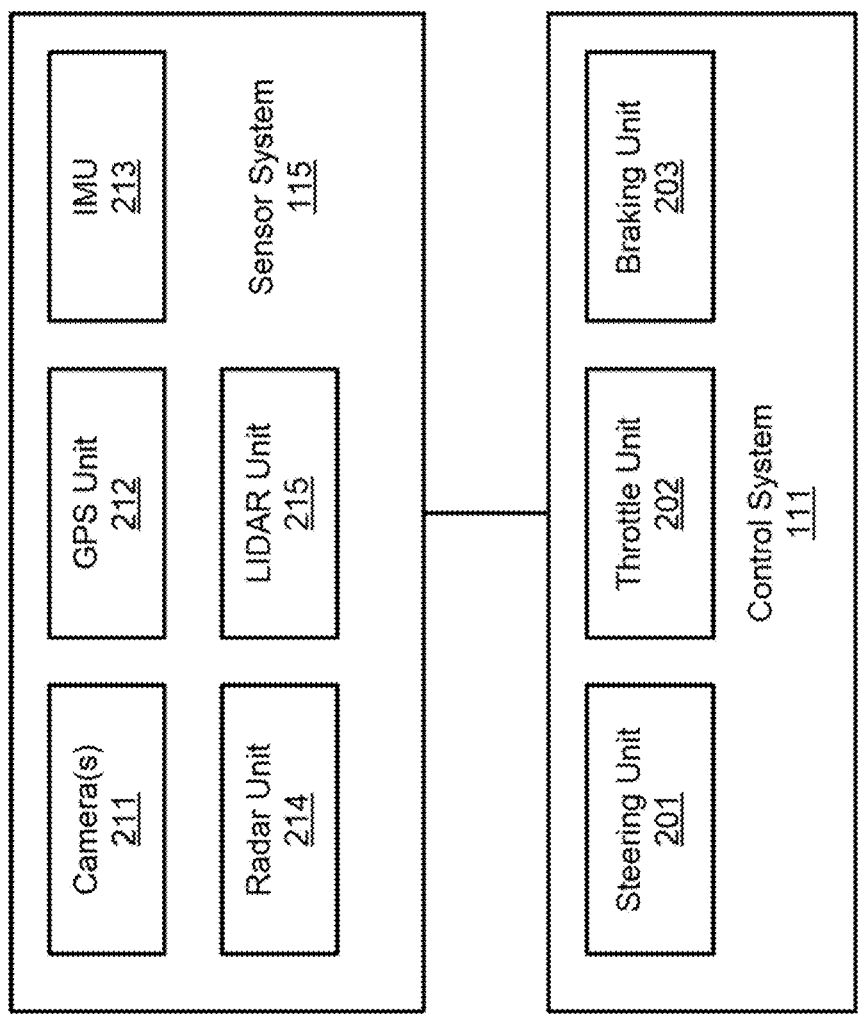
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include rules or algorithms for perception, prediction, decision, planning, and/or control processes, which will be described in details further below. Algorithms 124 can then be uploaded on ADVs to be utilized during autonomous driving in real-time.

Figure 3A:
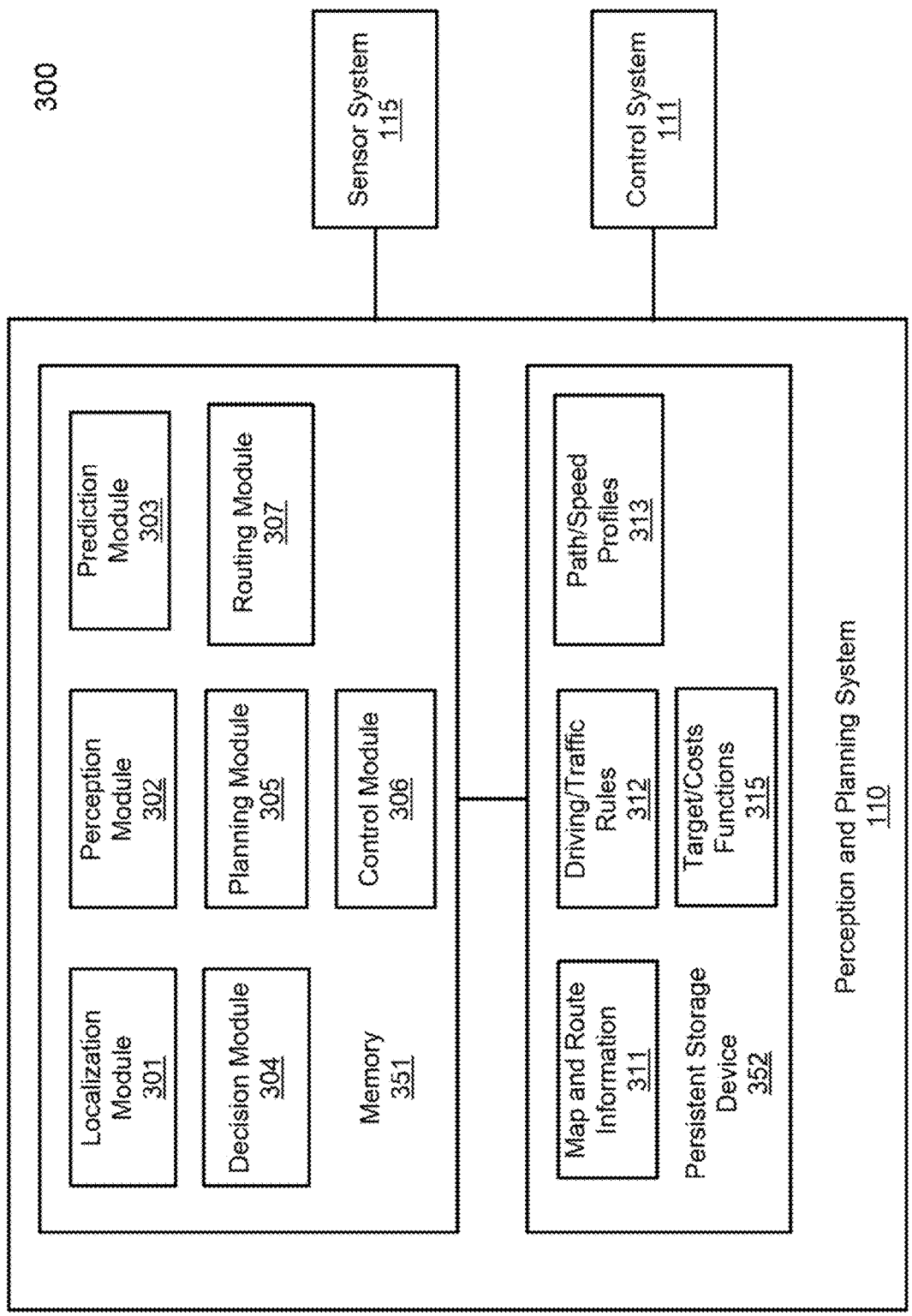
FIGS. 3A-3B are block diagrams illustrating examples of a perception and planning system used by an autonomous vehicle according to some embodiments.
Figure 3B:
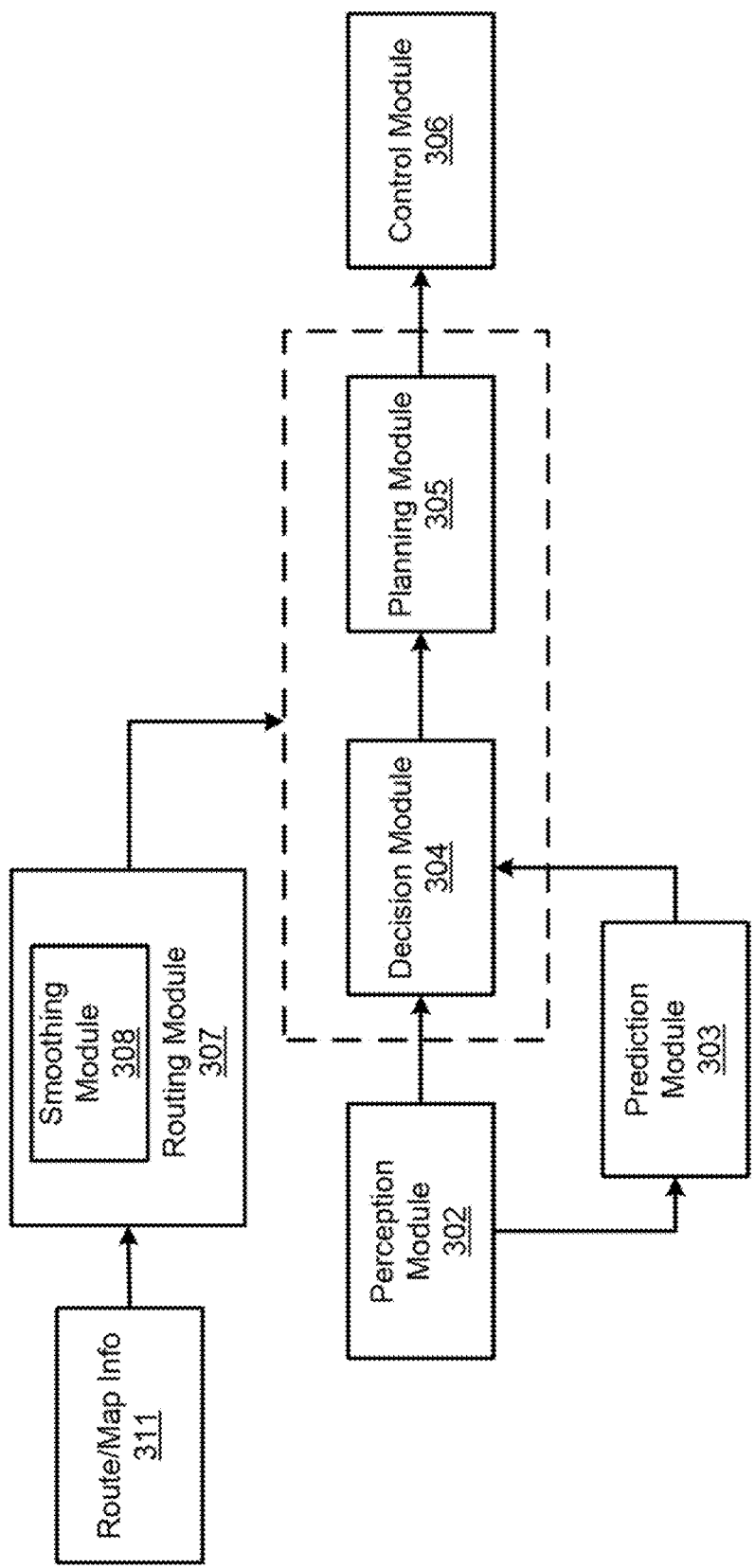

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

In one embodiment, decision module 304 generates a rough path profile based on a reference line provided by routing module 307 and based on obstacles and/or traffic information perceived by the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady. The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP).

In one embodiment, planning module 305 recalculates the rough speed profile using quadratic programming (QP) to optimize a speed cost function (as part of cost functions 315). Similar speed barrier constraints can be added to forbid the QP solver to search for some forbidden speeds.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
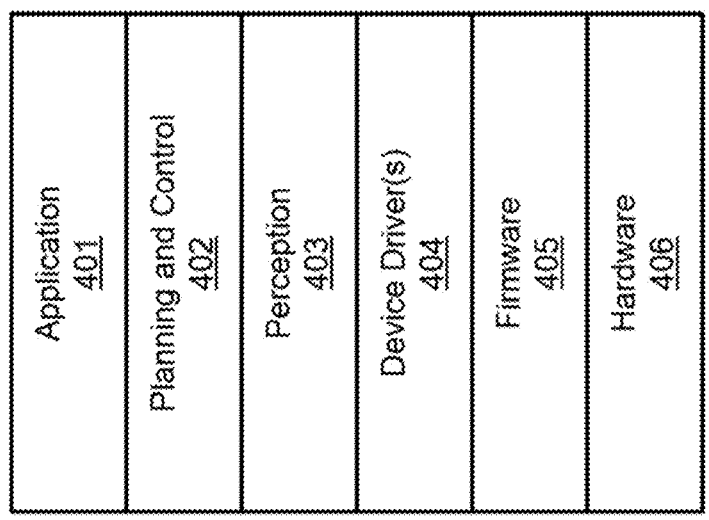
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404. In one embodiment, hardware layer 406 or perception layer 403 may include radar signal processing to suppress sidelobes due to artifacts introduced by FFT operations when performing the functionalities of the perception module 302 to detect targets.

Figure 5A:
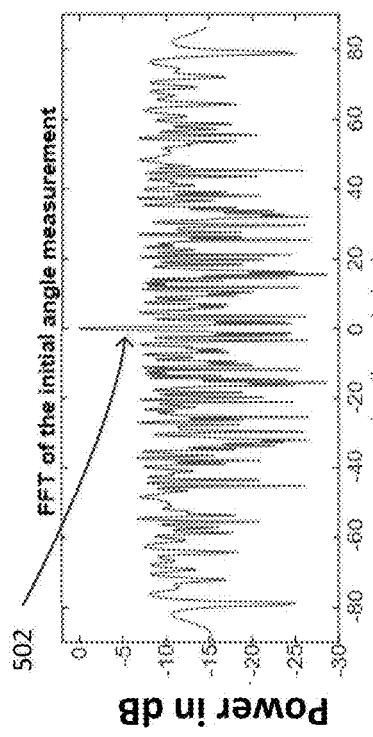
FIGS. 5A-5C are diagrams illustrating the effect of the sidelobe subtraction of the target signal from the angle-finding FFT data for a single target case according to one embodiment.
Figure 5B:
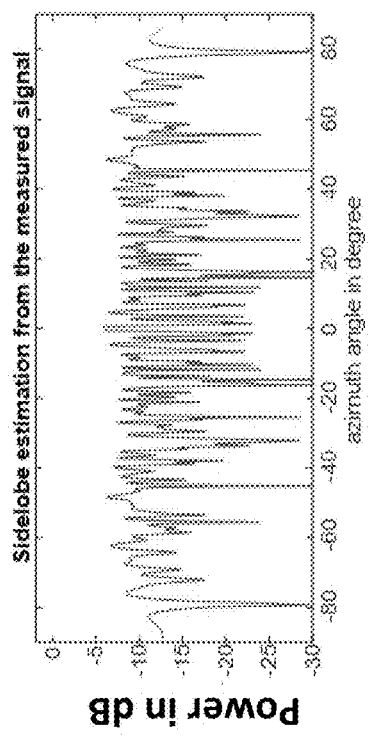
Figure 5C:
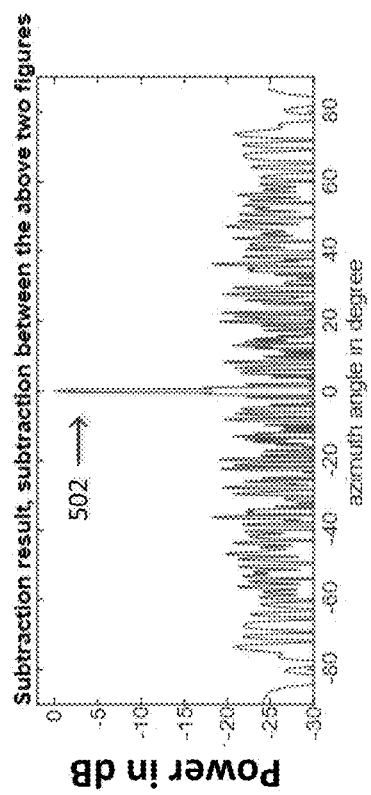

FIGS. 5A-5C are diagrams illustrating the effect of the sidelobe subtraction of the target signal from the angle-finding FFT data for a single target case according to one embodiment. In FIG. 5A, an angle-finding FFT response shows the received power of reflected radar signals from a target in dB across a range of azimuth angles. A radar may transmit frequency modulated continuous wave (FMCW) waveforms, known as chirps, and receive the backscattering energy from targets on the road.

Radar signal processing may process the received radar raw data to extract the range, Doppler velocity and angle information of the targets in sequence. For example, radar signal processing may process the received signals from each chirp using FFT to generate range information of the targets in a plot called range FFT. The range FFT may display the received power in dB over a range of distance from the radar. The range FFT for the corresponding frequency bins across the chirps of a cycle time may be processed using FFT to generate Doppler velocity information of the targets. A range-Doppler map may show the received power in dB across combinations of the ranges and the Doppler velocities for one or more targets. From the range Doppler map, the signal is determined by the received power exceeding a threshold. To resolve the azimuth angles of a target or of multiple targets that may have the same range and Doppler frequency, samples from the array elements may be further processed using FFT. For example, for an 8 channel antenna array, the signals from these 8 channels can generate angle finding FFT.

FIG. 5A shows one example of the angle-finding FFT for one target for a 12-element linear sparse array. The antenna array elements may have non-uniform spacing with omni-directional antenna pattern. A peak signal 502 from a target centered at an azimuth angle of 0 degree is shown. Artifacts of the FFT operation are manifested as sidelobes of the peak signal 502 where the sidelobes may be as high as −6.6 dB of the peak signal 502. To suppress the sidelobes, a sidelobe-suppression method may estimate the sidelobes of the peak signal 502. In one embodiment, the sidelobes of the peak signal 502 at an azimuth angle may be estimated by multiplying the received power of the samples from the range-Doppler map used to generate the angle-finding FFT by:

$$\Sigma_{n=1}^{N} e^{-jkrn} \quad \text{(Equation 1)}$$

where k is the wave number, $r_n$ is the distance between the target to the each antenna element, n is the array element index, and N is the number of array elements. For linear array equation 1 is simplified to $$\sum_{n=1}^{N} e^{-j2\pi n \frac{d}{\lambda} \sin \theta} \qquad \text{(Equation 2)}$$

where θ is the azimuth angle, d is the antenna array element spacing, and λ is the wavelength. The sidelobe-suppression method may estimate the sidelobes of the peak signal 502 using algorithm requiring different levels of computational effort. Suppression of the sidelobes by 15 dB or more with respect to the peak signal 502 may be achieved as a function of the computational effort expended and the performance improvement desired.

FIG. 5B shows the estimated sidelobes of the peak signal 502 across the range of azimuth angles from −90° to 90°. The sidelobe-suppression method may subtract the estimated sidelobes from the angle-finding FFT of FIG. 5A to obtain an updated FFT, referred to as a nearly-idealized FFT.

FIG. 5C shows the nearly-idealized angle-finding FFT after the subtraction of the estimated sidelobes from the original angle-finding FFT. The sidelobe level of the original angle-finding FFT has been reduced by about 12 dB, revealing a residual sidelobe level and noise that are down by at least 20 dB from the peak signal 502. The nearly-idealized FFT yields a higher dynamic range compared to that from the original FFT, enabling the detection of more weak targets next to stronger one. For image radars that are increasingly being adopted for autonomous vehicle applications, the higher dynamic range enables a clean image of the target to be generated.

Figure 6A:
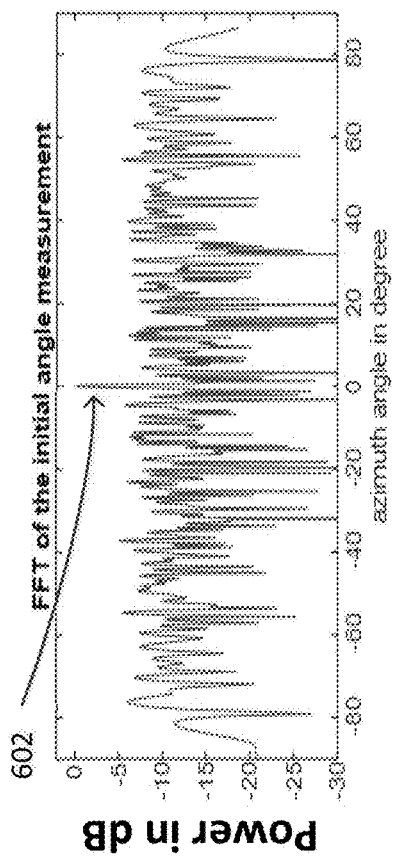
FIG. 6A-6C are diagrams illustrating the effect of the sidelobe subtraction of the target signal of the stronger target from the angle-finding FFT data for a two target case according to one embodiment.
Figure 6B:
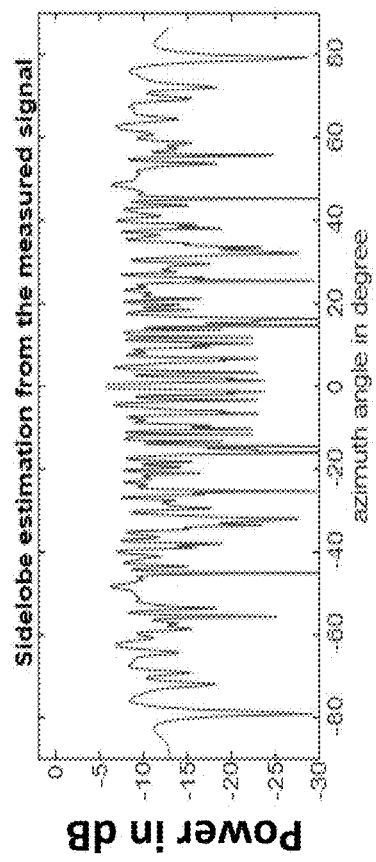
Figure 6C:
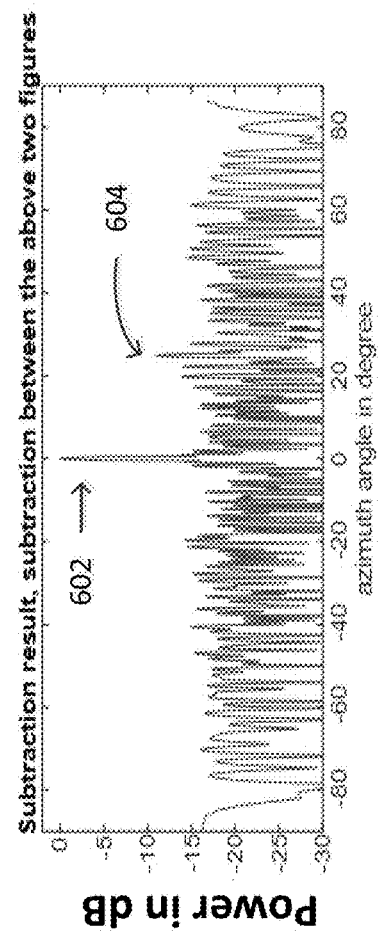

FIG. 6A-6C are diagrams illustrating the effect of the sidelobe subtraction of the target signal of the stronger target from the angle-finding FFT data for a two target case according to one embodiment. Two targets with the same range and Doppler velocity may be present. The range-Doppler map may not distinguish the two targets having the same range and Doppler frequency. For example, two vehicles may be traveling at the same speed on two lanes of a multi-lane road in front of a radar-carrying vehicle and at about the same distance from the radar-carrying vehicle. The stronger target may be at an azimuth angle of 0 degree of the radar-carrying vehicle and the other target, at about 12 dB weaker with respect to the stronger target, may be at an azimuth angle of 25°. To resolve the azimuth angles, an angle-finding FFT is generated.

FIG. 6A shows one example of the angle-finding FFT for the two targets at the same range and Doppler velocity. The angle-finding FFT shows only the peak signal 602 from the stronger target at the azimuth angle of 0 degree. Signals from the weaker target at the azimuth angle of 25° are not visible because they are buried by the sidelobes of the stronger target. To suppress the sidelobes of the stronger target, a sidelobe-suppression method may estimate the sidelobes of the stronger target. The sidelobe-suppression method may estimate the sidelobes of the stronger target as discussed in FIGS. 5A and 5B.

FIG. 6B shows the estimated sidelobes of the stronger target across the range of azimuth angles from −90° to 90°. The sidelobe-suppression method may estimate the sidelobes of the peak signal 502 using algorithm requiring different levels of computational effort. Suppression of the sidelobes by 15 dB or more with respect to the peak signal 602 of the stronger target may be achieved as a function of the computational effort expended and the performance improvement desired. For example, the sidelobe suppression method may initially estimate the sidelobes of the stronger peak using a default low effort level. In one embodiment, if the residual sidelobe level in a nearly-idealized FFT after subtracting the estimated sidelobes of the stronger peak from the original FFT is higher than a maximum threshold level, the sidelobe-subtraction method may iteratively expend additional effort to estimate the sidelobes of the stronger target to bring the residual sidelobe level in the nearly-idealized FFT below the maximum threshold level.

FIG. 6C shows the nearly-idealized angle-finding FFT after subtracting the estimated sidelobes of the stronger target of FIG. 6B from the original angle-finding FFT of FIG. 6A. The sidelobe level of the original angle-finding FFT has been reduced by about 10 dB, revealing the peak signal 604 from the weaker target at the azimuth angle of 25°. In one embodiment, if the residual sidelobe level in the nearly-idealized angle-FFT is higher than a desired threshold, or if detection of additional targets is desired, the sidelobe subtraction method may estimate the sidelobes of the peak signals 602 or 604. In one embodiment, as in the estimation of the sidelobe of the peak signal 602 of the stronger target, the sidelobe suppression method may expend different levels of efforts to bring the residual sidelobe level below a desired threshold. In one embodiment, the sidelobe suppression method may subtract the estimated sidelobes of the weaker target from the nearly-idealized angle-FFT of FIG. 6C to suppress the residual sidelobe level even further, possibly revealing additional targets. The sidelobe suppression method may iteratively estimate the sidelobes of additional targets and subtract the estimated sidelobes of the additional targets until the desired residual sidelobe level is reached.

While the sidelobe suppression method has been discussed for suppressing sidelobes of targets in angle-finding FFT, the method is also applicable for suppressing sidelobes of targets in range FFT, Doppler FFT, or in other signal processing operations using FFT. For example, in range FFT, the method may suppress the sidelobes of the strongest target in the search range, such as a highly reflective target, to reveal weaker targets that have less reflective property and are otherwise buried by the sidelobes of the strongest target. Similarly, in the Doppler FFT, the method may suppress the sidelobes of the strongest target in the Doppler FFT to reveal weaker targets on the map that are otherwise buried by the sidelobes of the strongest target.

Figure 7:
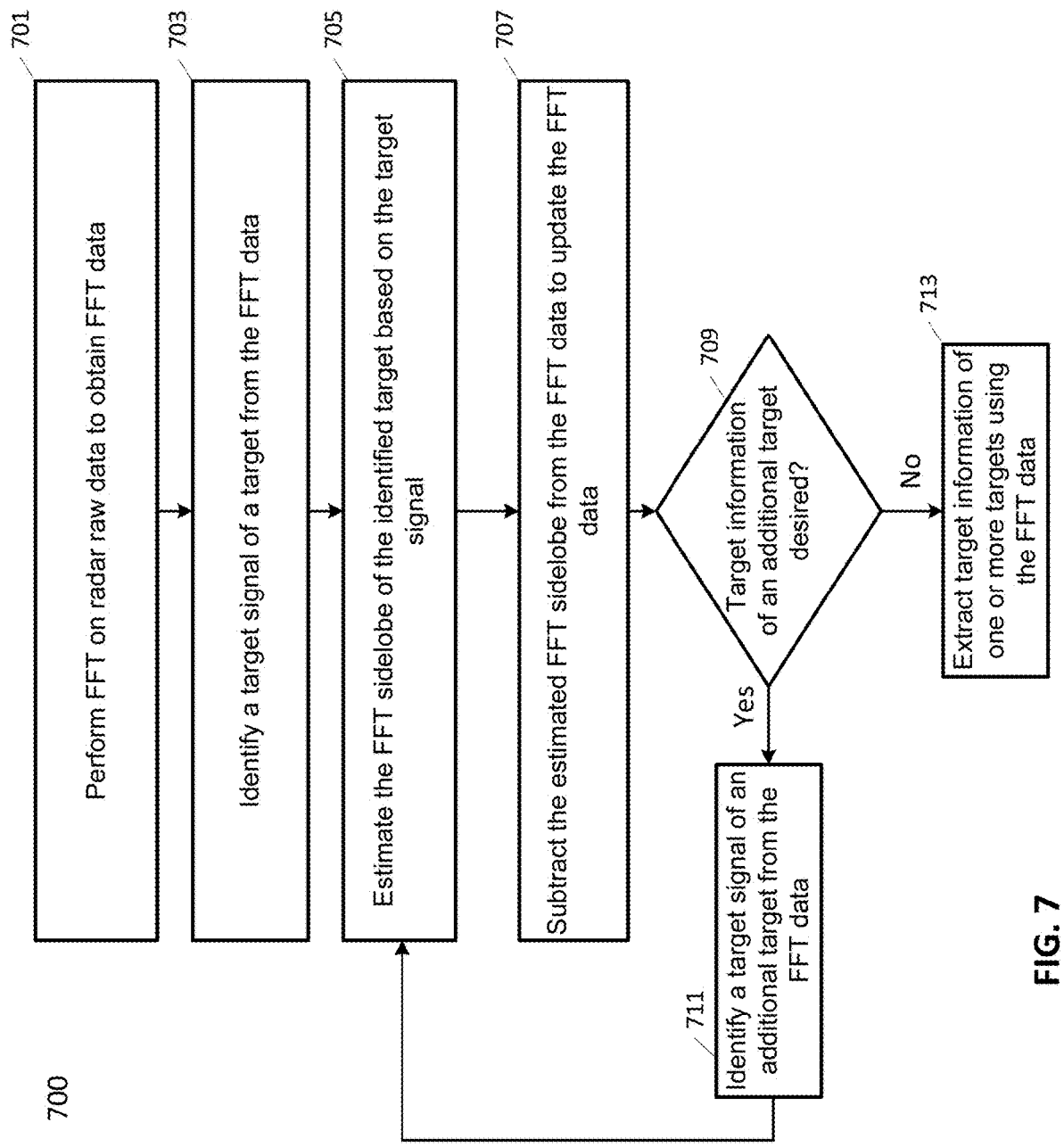
FIG. 7 is a flow diagram illustrating a method of the FFT sidelobe subtraction method according to one embodiment.

FIG. 7 is a flow diagram illustrating a method of the FFT sidelobe subtraction method according to one embodiment. The sidelobe suppression method 700 may be performed by processing logic which may include software, hardware, or a combination thereof. For example, the sidelobe suppression method 700 may be performed by the radar unit 214 of the sensor system 115 of FIG. 2. The sidelobe suppression method is applicable to range FFT, Doppler FFT, angle-finding FFT, or other FFT operations in the signal processing of radars or other sensors.

At block 701, the method performs FFT on the raw radar data to generate an original FFT data for range, Doppler, or angle finding. For example, for a N channel antenna array, the method performs the angle finding FFT for N channels.

At block 703, the method identifies a target signal of a target from the original FFT data. In one embodiment, the method may identify the target signal of the strongest target if there are multiple targets. For example, the method may identify the peak signal of a strongest target in the angle-finding FFT.

At bock 705, the method estimates the FFT sidelobe of the identified target based on the target signal. In one embodiment, the method may estimate the FFT sidelobes of the identified target across a range of azimuth angles in the angle-finding FFT. The method may estimate the FFT sidelobes of the target signal using an algorithm requiring different levels of computational effort. In one embodiment, suppression of the sidelobes by 15 dB or more with respect to the target signal may be achieved as a function of the computational effort expended and the performance improvement desired.

At block 707, the method subtracts the estimated FFT sidelobes from the original FFT data to update the FFT data. For example, the method may subtract the estimated FFT sidelobes of the identified target in the angle-finding FFT from the angle-finding FFT to obtain a nearly-idealized angle-finding FFT. The residual sidelobe level of the updated FFT data is suppressed with respect to the target signal of the identified target compared to the sidelobe level of the original FFT data by the estimated FFT sidelobes.

At block 709, the method determines if target information of an additional target is desired. In one embodiment, the method may compare the residual sidelobe level of the updated FFT data against a maximum threshold. If the residual sidelobe level is higher than the maximum threshold, the method may identify an additional target to estimate the FFT sidelobes of the additional target and to further suppress the residual sidelobe level by subtracting the estimated FFT sidelobes of the additional target. In one embodiment, if the residual sidelobe level is higher than the maximum threshold, and even if no additional targets may be identified, the method may expend additional effort such as increasing the FFT points to estimate the FFT sidelobes of the first target to a more accurate level and may subtract the more accurate estimate of the FFT sidelobes of the first target from the original FFT data to obtain an nearly-idealized FFT with a reduced residual sidelobe level.

At block 711, if the target information of an additional target is desired, the method may identify the target signal of an additional target. For example, the method may identify the target signal of the next strongest target. The additional targets may have been buried by the sidelobes of the first target in the original FFT data and are revealed in the updated or nearly-idealized FFT data. The method may repeat blocks 705 and 707 to estimate the FFT sidelobes of the additional target and to subtract the estimated FFT sidelobes of the additional target from the current FFT data to update the FFT data. The method may identify additional targets and may iteratively repeat blocks 705 and 707 until the desired residual sidelobe level is achieved.

At block 713, if no additional target information is desired or if the desired residual sidelobe level is reached, the method may extract the target information of the one or more targets using the FFT. For example, the method may extract the azimuth angles of the one or more targets from the angle-finding FFT.

A data processing system may perform any of the processes or methods described above, such as, for example, the sidelobe suppression method. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the computer-implemented method comprising:
   performing, by the ADV, a fast Fourier Transform (FFT) operation on data collected by a radar unit mounted on the ADV to obtain original FFT data;
   estimating, by the ADV, FFT sidelobes of a target based on a target signal identified from the original FFT data;
   subtracting, by the ADV, the estimated FFT sidelobes of the target from the original FFT data to generate current FFT data, wherein the current FFT data has a current residual FFT sidelobe level;
   determining, by the ADV, if the current residual FFT sidelobe level is lower than a desired threshold; and
   in response to determining that the current residual FFT sidelobe level is lower than the desired threshold, extracting, by the ADV, information of the target from the current FFT data, and in response to determining that the current residual FFT sidelobe level is not lower than the desired threshold, iteratively identifying an additional target signal of an additional target from the current FFT data, estimating FFT sidelobes of the additional target based on the additional target signal, and subtracting the estimated FFT sidelobes of the additional target from the current FFT data to update the current FFT data and to update the current residual FFT sidelobe level, wherein the current FFT data is utilized by the ADV to generate a planned trajectory for guiding the ADV.

2. The computer-implemented method of claim 1, wherein identifying a target signal of a target from the original FFT data comprises identifying the target signal of a strongest target.

3. The computer-implemented method of claim 1, wherein the additional target signal of the additional target comprises the additional target signal of a next strongest target.

4. The computer-implemented method of claim 1, wherein estimating FFT sidelobes of the target based on the target signal comprises generating the estimated FFT sidelobes of the target over a range of sidelobe levels, wherein the estimated FFT sidelobes of the target having a more accurate estimate of the FFT sidelobes corresponds to a higher level of computational effort.

5. The computer-implemented method of claim 4, wherein in response to determining that the current residual FFT sidelobe level is not lower than the desired threshold, iteratively increasing FFT points of the FFT operation, the method further comprises:
   estimating FFT sidelobes of the target based on the target signal using the increased FFT points to generate a more accurate estimate of the FFT sidelobes of the target; and
   subtracting the more accurate estimate of the FFT sidelobes of the target from the current FFT data to update the current FFT data and to update the current residual FFT sidelobe level until the current residual FFT sidelobe level is lower than the desired threshold.

6. The computer-implemented method of claim 1, wherein extracting information of the target from the current FFT data in response to determining that the current residual FFT sidelobe level is lower than the desired threshold comprises extracting one or more targets from a range, a Doppler velocity, or an azimuth angle FFT processing.

7. A non-transitory machine-readable medium having instructions stored therein, which when executed by a processor, cause the processor to perform operations for operating an autonomous driving vehicle (ADV), the operations comprising:
   performing, by the ADV, a fast Fourier Transform (FFT) operation on data collected by a radar unit mounted on the ADV to obtain original FFT data;
   estimating, by the ADV, FFT sidelobes of a target based on a target signal identified from the original FFT data;
   subtracting, by the ADV, the estimated FFT sidelobes of the target from the original FFT data to generate current FFT data, wherein the current FFT data has a current residual FFT sidelobe level;
   determining, by the ADV, if the current residual FFT sidelobe level is lower than a desired threshold; and
   in response to determining that the current residual FFT sidelobe level is lower than the desired threshold, extracting, by the ADV, information of the target from the current FFT data, and in response to determining that the current residual FFT sidelobe level is not lower than the desired threshold, iteratively identifying an additional target signal of an additional target from the current FFT data, estimating FFT sidelobes of the additional target based on the additional target signal, and subtracting the estimated FFT sidelobes of the additional target from the current FFT data to update the current FFT data and to update the current residual FFT sidelobe level, wherein the current FFT data is utilized by the ADV to generate a planned trajectory for guiding the ADV.

8. The machine-readable medium of claim 7, wherein identifying a target signal of a target from the original FFT data comprises identifying the target signal of a strongest target.

9. The machine-readable medium of claim 7, wherein the additional target signal of the additional target comprises the additional target signal of a next strongest target.

10. The machine-readable medium of claim 7, wherein estimating FFT sidelobes of the target based on the target signal comprises generating the estimated FFT sidelobes of the target over a range of sidelobe levels, wherein the estimated FFT sidelobes of the target having a more accurate estimate of the FFT sidelobes corresponds to a higher level of computational effort.

11. The machine-readable medium of claim 10, wherein in response to determining that the current residual FFT sidelobe level is not lower than the desired threshold, iteratively increasing FFT points of the FFT operation, the operations further comprise:
  estimating FFT sidelobes of the target based on the target signal using the increased FFT points to generate a more accurate estimate of the FFT sidelobes of the target; and
  subtracting the more accurate estimate of the FFT sidelobes of the target from the current FFT data to update the current FFT data and to update the current residual FFT sidelobe level until the current residual FFT sidelobe level is lower than the desired threshold.

12. The machine-readable medium of claim 7, wherein extracting information of the target from the current FFT data in response to determining that the current residual FFT sidelobe level is lower than the desired threshold comprises extracting one or more targets from a range, a Doppler velocity, or an azimuth angle FFT processing.

13. A data processing system, comprising:
  a radar unit mounted on an autonomous driving vehicle (ADV);
  a processor;
  a memory coupled to the processor to store instructions, which when executed by the processor, cause the processor to perform operations, the operations comprising:
    performing a fast Fourier Transform (FFT) operation on the data collected by a radar unit mounted on the ADV to obtain original FFT data,
    estimating FFT sidelobes of a target based on a target signal identified from the original FFT data,
    subtracting the estimated FFT sidelobes of the target from the original FFT data to generate current FFT data, wherein the current FFT data has a current residual FFT sidelobe level,
    determining if the current residual FFT sidelobe level is lower than a desired threshold, and
    in response to determining that the current residual FFT sidelobe level is lower than the desired threshold, extracting, by the radar unit, information of the target from the current FFT data, and in response to determining that the current residual FFT sidelobe level is not lower than the desired threshold, iteratively identifying an additional target signal of an additional target from the current FFT data, estimating FFT sidelobes of the additional target based on the additional target signal, and subtracting the estimated FFT sidelobes of the additional target from the current FFT data to update the current FFT data and to update the current residual FFT sidelobe level, wherein the current FFT data is utilized by the ADV to generate a planned trajectory for guiding the ADV.

14. The system of claim 13 wherein identifying a target signal of a target from the original FFT data comprises identifying the target signal of a strongest target.

15. The system of claim 13, wherein the additional target signal of the additional target comprises the additional target signal of a next strongest target.

16. The system of claim 13, wherein estimating FFT sidelobes of the target based on the target signal comprises generating the estimated FFT sidelobes of the target over a range of sidelobe levels, wherein the estimated FFT sidelobes of the target having a more accurate estimate of the FFT sidelobes corresponds to a higher level of computational effort.

17. The system of claim 16, wherein in response to determining that the current residual FFT sidelobe level is not lower than the desired threshold, iteratively increasing FFT points of the FFT operation, the operations further comprise:
  estimating FFT sidelobes of the target based on the target signal using the increased FFT points to generate a more accurate estimate of the FFT sidelobes of the target; and
  subtracting the more accurate estimate of the FFT sidelobes of the target from the current FFT data to update the current FFT data and to update the current residual FFT sidelobe level until the current residual FFT sidelobe level is lower than the desired threshold.

18. The system of claim 13, wherein extracting information of the target from the current FFT data in response to determining that the current residual FFT sidelobe level is lower than the desired threshold comprises extracting one or more targets from a range, a Doppler velocity, or an azimuth angle FFT processing.

* * * * *